United States Patent [19]

Massara et al.

[11] Patent Number: 5,833,317
[45] Date of Patent: Nov. 10, 1998

[54] AUTOMOTIVE SEAT BACK RECLINER

[75] Inventors: Andrew Massara, Southfield; Philip Leistra, III, Novi; James Masters, Farmington Hills; Russell Davidson, Dearborn; Richard Lawrence Matsu, Plymouth; Sheryar Durrani, Canton, all of Mich.

[73] Assignee: Lear Corporation, Southfield, Mich.

[21] Appl. No.: 705,422

[22] Filed: Aug. 29, 1996

Related U.S. Application Data

[60] Provisional application No. 60/007,548, Nov. 27, 1995.
[51] Int. Cl.$^6$ ...................................................... B60N 2/22
[52] U.S. Cl. ......................... 297/374; 297/301.7; 188/67; 267/172; 267/173
[58] Field of Search ................................ 297/374, 307.1; 267/172, 173, 154; 188/77 W, 82.6, 67

[56] References Cited

U.S. PATENT DOCUMENTS

| 1,263,161 | 4/1918 | Travers . |
| 1,846,429 | 2/1932 | McGiffert ............................ 188/82.6 X |
| 1,856,534 | 5/1932 | Boery . |
| 2,961,217 | 11/1960 | Sacchini .............................. 188/82.6 X |
| 3,230,595 | 1/1966 | Kedem ....................................... 188/67 |
| 3,285,657 | 11/1966 | De Gaston . |
| 3,501,198 | 3/1970 | Boyce . |
| 3,517,965 | 6/1970 | Cowles et al. . |
| 3,926,474 | 12/1975 | Johndrow et al. . |
| 4,062,587 | 12/1977 | Wolters . |
| 4,184,714 | 1/1980 | Courtois . |
| 4,425,987 | 1/1984 | Porter ....................................... 188/67 |
| 4,573,738 | 3/1986 | Heesch . |
| 4,600,240 | 7/1986 | Suman et al. . |
| 4,634,182 | 1/1987 | Tanaka . |
| 4,687,252 | 8/1987 | Bell et al. . |
| 4,690,458 | 9/1987 | Pipon et al. . |
| 4,696,515 | 9/1987 | Heesch . |
| 4,705,319 | 11/1987 | Bell . |
| 4,720,144 | 1/1988 | Heesch . |
| 4,781,415 | 11/1988 | Heesch et al. . |
| 5,163,736 | 11/1992 | Aljundi . |

FOREIGN PATENT DOCUMENTS

| 1093146 | 11/1960 | Germany .............................. 267/154 |
| 0294227 | 12/1986 | Japan .................................. 188/77 W |
| 22685 | 12/1900 | United Kingdom ................ 188/77 W |

Primary Examiner—Peter M. Cuomo
Assistant Examiner—David E. Allred
Attorney, Agent, or Firm—MacMillan, Sobanski & Todd, LLC

[57] ABSTRACT

The seat back flanges (32) mount a seat back (34) to a seat frame for reclining movement relative to the seat frame and a control mechanism controls the pivotal movement of the seat back (34). The control mechanism includes a tubular cylinder (54) and a first coil spring (56) is wound around and in gripping engagement with the cylinder (54). The cylinder (54) is non-rotatably secured to the seat frame by being welded or otherwise secured to the flanges (32). The first coil spring (56) has first (58) and second (60) ends extending tangentially from the cylinder (54). A second coil spring (62) is wound in the opposite direction around and is in gripping engagement with the cylinder (54) and, likewise, has third (64) and fourth (66) ends extending tangentially from the cylinder (54). A cam shaft (72) is included for moving the second end (60) relative to the first end (58) for unwinding the first coil spring (56) in a clockwise direction from the gripping engagement with the cylinder (54) to allow the pivotal movement of the seat back (34) relative to the seat frame and for moving the fourth end (66) relative to the third end (64) for unwinding the second coil spring (62) in a counterclockwise direction from the gripping engagement with the cylinder (54) to allow the pivotal movement of the seat back relative to the seat frame.

7 Claims, 3 Drawing Sheets

AUTOMOTIVE SEAT BACK RECLINER

RELATED APPLICATION

This application claims priority to and all of the benefits of co-pending U.S. provisional patent application Ser. No. 60/007,548 which was filed on Nov. 27, 1995 and is entitled "Modular Vehicle Seat Assembly." This application also claims priority to and all of the benefits of co-pending U.S. provisional patent application entitled "Improved Modular Vehicle Seat Assembly" which was filed on May 7, 1996 and has attorney docket number 65467-302.

TECHNICAL FIELD

The subject invention relates to automotive seat assemblies and, more specifically, to a recliner mechanism for controlling the reclining movement of a seat back in a front seat assembly.

BACKGROUND OF THE INVENTION

Many reclining mechanisms and a variety of inertia operated locks, used are extensively in the automotive field where at least the driver's seat usually has a backrest adjustable to different angles relative to the seat. In the case of two door vehicles having a rear passenger seat, the backrests of the front seats are often provided with hinged mechanisms which in a normal condition allow the backrest to be readily pushed forward and tilted out of the way so as to facilitate access to the back seat. These hinge mechanisms remain unlocked even while the front seat is normally occupied during operation of the vehicle.

Such hinges frequently include inertia operated devices for locking the backrest of the front seats to prevent them from being thrown in the event sudden braking or collision, and to prevent the backrest from falling forward whenever the vehicle is on a steep incline. A variety of mechanisms for accomplishing these objectives are known and in use.

Presently known recliner adjustment mechanisms frequently include two members hinged together, a gear rack formed along an arcuate edge of one member and a toothed pawl element pivotally mounted to the other member and movable into engagement with the rack so as to interlock the two members at a selected position. While such mechanisms are generally effective and many variations of the same are known, they suffer from a significant shortcoming in that they require relatively complicated linkages between the pivotable pawl element which is mounted in the vicinity of the hinged joint, i.e. underneath the backrest and towards the rear of the seat, and a release handle which desirably is more accessibly located closer to the front of the seat so as to be within easier reach of the driver. A further shortcoming inherent in pivoting pawl elements is that the teeth on the pawl do not all mesh simultaneously with the teeth on the rack. Due to the pivotal mounting of the pawl, the teeth nearest the pivot point of the pawl mesh with the rack teeth slightly ahead of the pawl teeth distal from the pivot point. It is therefore possible in some systems for a false engagement to occur between the pawl and the rack in which a single tooth of the pawl engages the rack in such a way as to prevent full meshing of the gear teeth but which upon subsequent application of weight or force to the backrest the pawl disengages from the rack allowing the backrest to fall back to its fully reclined position under the weight of the driver's body, suddenly depriving the driver of back support.

Existing inertia locks for vehicle backrests also are deficient in that no mechanism known to this applicant achieves a positive locking action between the backrest and the fixed portion of the seat without allowing some forward tilting of the backrest before the locking action is completed. A further defect in certain existing inertial locking mechanisms is that the mechanism may lock if the backrest is pushed forward too quickly during entry or exit by a passenger.

Examples of such prior art systems are disclosed in U.S. Pat. Nos. 4,184,714 to Courtois and 4,634,182 to Tanaka.

Yet other recliner mechanisms provide infinite degrees of reclining adjustment and some resistance to movement in response to impact forces. Examples of such prior art systems are disclosed in U.S. Pat. Nos. 3,517,965 to Cowles et al and 4,690,458 to Pipon et al.

SUMMARY OF THE INVENTION AND ADVANTAGES

A seat assembly comprising a seat frame and a seat back including a pair of spaced upright members each having lower ends and upper ends with mounting means at the lower ends for mounting the seat back to the seat frame for pivotal movement relative to the seat frame; and a control mechanism for controlling the pivotal movement including a cylinder and a first coil spring wound around and in gripping engagement with the cylinder, the first coil spring having first and second ends extending tangentially from the cylinder, and an actuator for moving the second end relative to the first end for unwinding the first coil spring in a clockwise direction from the gripping engagement to allow the pivotal movement of the seat back relative to the seat frame, the actuator including a cam shaft in parallel relationship to the cylinder and engaging the second end, the cam shaft being rotatably supported by the seat back for rotary movement between a set position with the coil spring in the gripping engagement with the cylinder to prevent the pivotal movement of the seat back relative to the seat frame and a release position having moved the second end in an unwinding direction to unwind the coil spring from the gripping engagement to allow the pivotal movement of the seat back relative to the seat frame.

Accordingly, the subject invention provides an improved recliner mechanism which provides infinite degrees of adjustment, yet positively resists pivotal movement of the seat back in response to impact forces, and is neatly packaged in the seat assembly.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
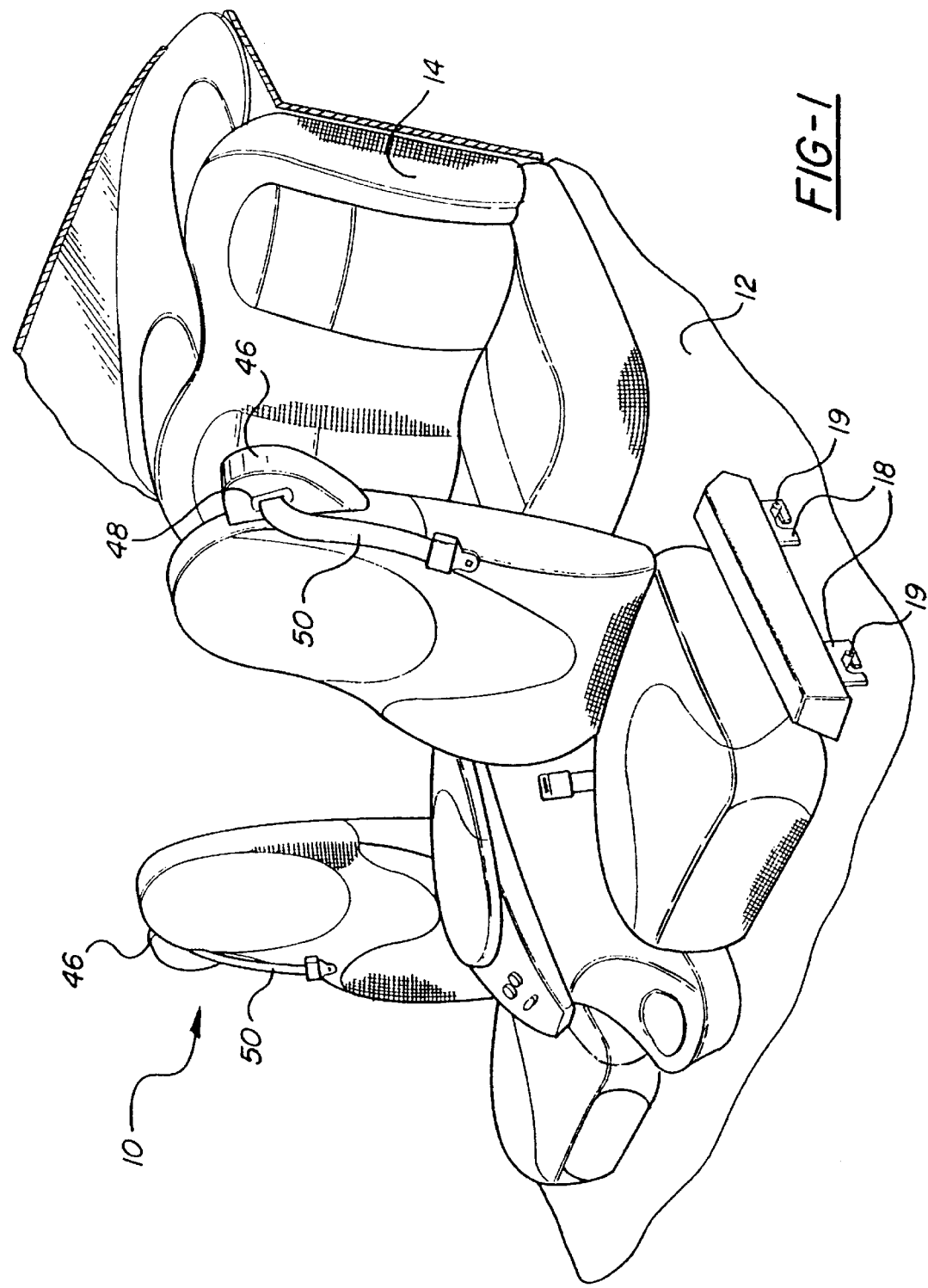
FIG. 1 is a perspective view of the interior of an automobile showing a rear seat assembly in combination with the front seat assembly of the subject invention.
Figure 2:
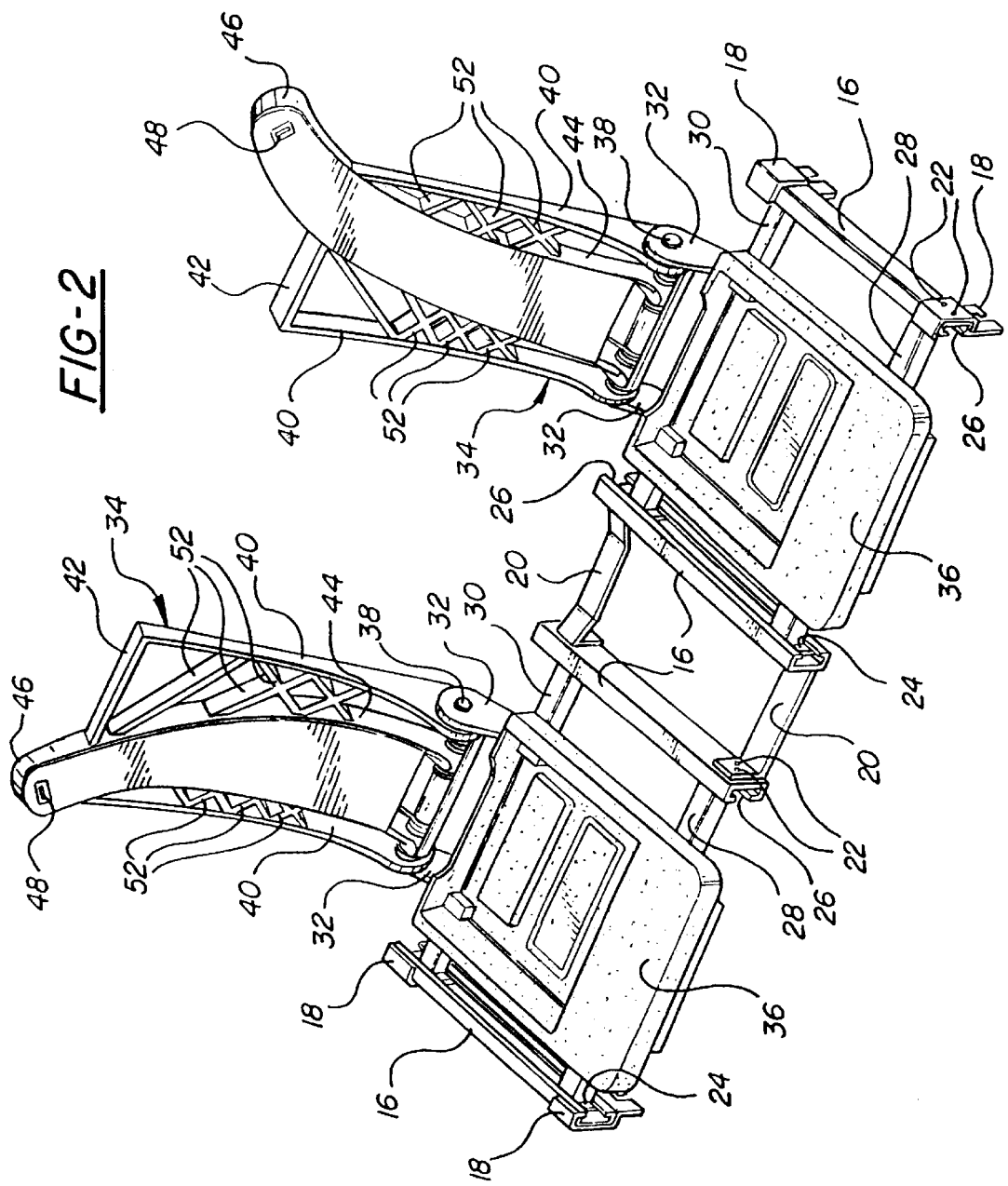
FIG. 2 is a perspective view of the support components of the front seat assembly employing the subject invention.
Figure 3:
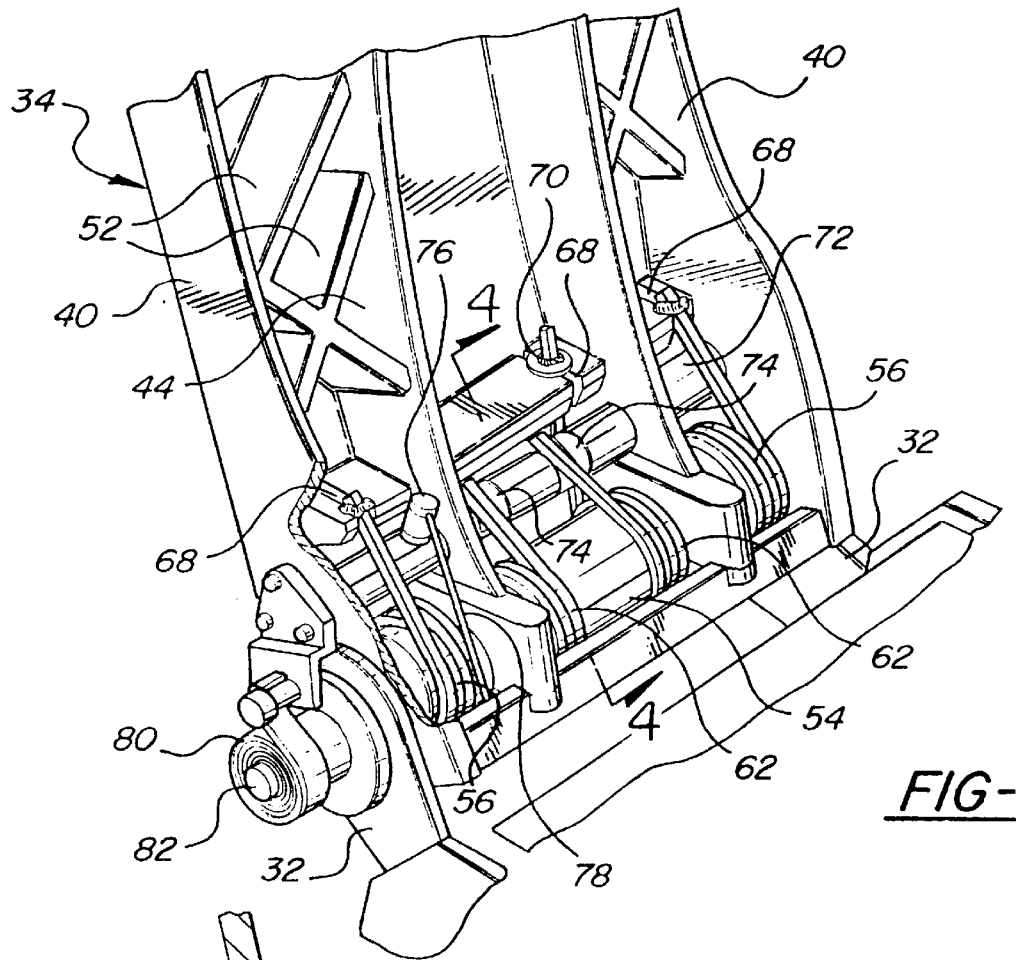
FIG. 3 is a fragmentary perspective view of the recliner mechanism of the subject invention.
Figure 4:
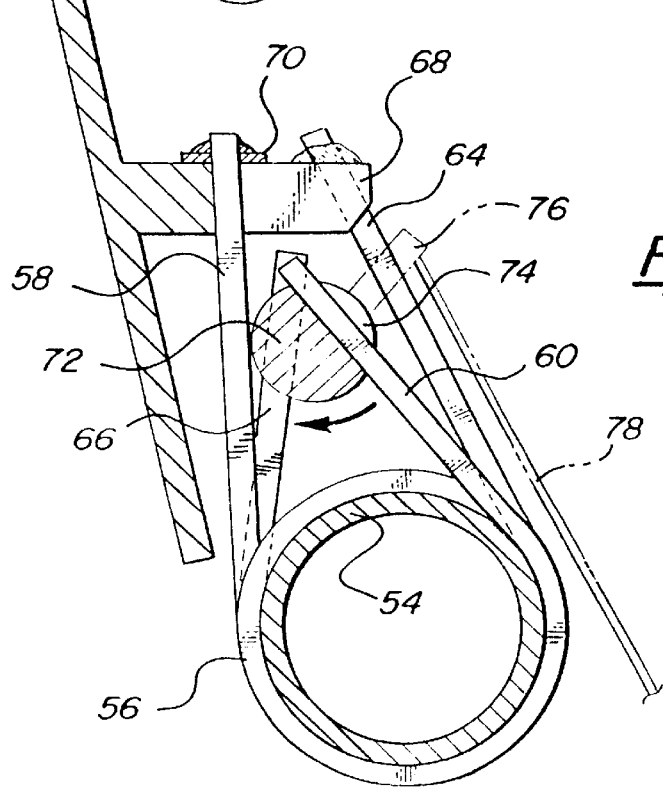
FIG. 4 is a fragmentary cross sectional view taken along line 4—4 of FIG. 3.

Referring to the Figures, wherein like numerals indicate like or corresponding parts throughout the several views, a front seat assembly is generally shown at 10. The assembly 10 is to be installed as a unit in a vehicle 12 in front of a rear seat assembly 14.

The seat assembly 10 comprises two seats with each including a pair of fixed rails 16 extending fore and aft and being laterally spaced across the vehicle 12 from one another. A plurality of brackets 18 and 20 are attached by rivets 22, spot welds, or the equivalent, to the fixed rails 16 for attachment to a vehicle body 12. Preferably, the brackets 18 include L-shaped slots which latch onto hooks 19 which extend from the vehicle 12. A slide rail 24 is supported by each of the fixed rails 16 for fore and aft movement relative to the fixed rails 16. The fixed rails 16 comprise the C-shaped channels having openings 26 which face one another and the slide rails 24 are slidably disposed in the C-shaped channels defining the fixed rails 16. Although not shown, roller or ball bearings may support the slide rails 24 in the fixed rails 16.

A pair of front 28 and rear 30 cross beams interconnect the slide rails 24 for supporting all of the remaining components of a first seat supported totally on the cross beams 28 and 30. The cross beams 28 and 30 extend through the openings 26 in the C-shaped channels defining the fixed rails 16 with the ends thereof attached to the slide rails 24, which are disposed inside the C-shaped channels 16. A seat support pan 36 is supported on the cross beams 28 and 30. The specifics of the seat pan 36 and the underlying framework form the subject matter of an independent invention disclosed and claimed in co-pending application serial number (H&H:65467.117) filed concurrently herewith and assigned to the assignee hereof.

A pair of seat back flanges 32 support a seat back, generally indicated at 34, on the underlying seat frame described above. The rear cross beam 30 of the seat frame has a triangular cross section and each of the seat back flanges 32 has an irregular or triangular opening complementary to and surrounding the rear cross beam 30 for supporting the seat back 34 on the rear cross beam 30. Appropriate pivot pins 38 interconnect the seat back 34 and the flanges 32 for reclining movement of the seat back 34. The seat back 34 comprises a pair of spaced upright members 40 each having lower ends rotatably supported on the pivot pins 38. In other words, the pivot pins 38 define mounting means at the lower ends of the upright members 40 for mounting the seat back 34 to the flanges 32 of the seat frame. The upright members 40 have upper ends interconnected by a cross member 42 extending between the upper ends.

A shoulder belt housing 44 extends upwardly between the upright members 40 from below the cross member 42 to a distal end 46 disposed above the cross member 42. The shoulder belt housing 44 defines a belt opening 48 for guiding a shoulder belt 50. The opening 48 is disposed vertically above one of the upright members 40 for positioning the shoulder belt 50 over the shoulder of an occupant. As shown, the belt opening 48 is positioned outside the area between the upright members 40.

The seat back 34 includes crisscrossing truss elements 52 interconnecting the upright members 40 and the housing 44. The truss elements 52 suspend the housing 44 within the periphery of the seat back as defined by the upright members 40 and the cross member 42. Preferably, the upright members 40 and the cross member 42 and the truss elements 52 and the housing 44 are all integrally formed of a homogeneous material, such as being die cast of magnesium. The housing 44 includes a lower end disposed midway between the upright members 40 and curves upwardly and outwardly to the distal end 46 on one side of the seat back 34.

The seat back flanges 32 mount the seat back 34 to the seat frame for pivotal movement relative to the seat frame and a control mechanism is included for controlling the pivotal movement of the seat back 34. The control mechanism includes a cylinder 54 and a first coil spring 56 wound around and in gripping engagement with the cylinder 54. The cylinder 54 is non-rotatably secured to the seat frame by being welded or otherwise secured to the flanges 32. The first coil spring 56 has first 58 and second 60 ends extending tangentially from the cylinder 54. A second coil spring 62 is wound around and in gripping engagement with the cylinder 54 and, likewise, has third 64 and fourth 66 ends extending tangentially from the cylinder 54. Each of the coils 56 and 62 is rectangular in cross section with one of the sides or edges thereof being in the gripping frictional engagement with the cylinder 54.

The seat back 34 defines or presents slots 68 and the first 58 and third 64 ends are retained in the slots 68. More specifically, washers 70 are welded to the first ends 58 to prevent the first ends 58 from being pulled through the associated slot 68. Because the third ends 64 of the other coils are disposed at an angle in the slots 68, they are welded directly to the sides of the slots 68. Alternatively, straps or loops could extend across the slots 68 with washers likewise welded to the third ends 64 and retained in the slots 68 thereby. Therefore, the first 58 and third 64 ends are secured to the seat back.

As one skilled in the art can appreciate, the second 60 and forth 66 ends could be retained in slots 68 with the first 58 and third 64 ends continuously to extend tangentially from the cylinder 54. In addition, the first 58, second 60, third 64, and forth 66 ends do not necessarily have to extend tangentially in the same direction, i.e., they may be transverse to one another. To that end the first 58 and third 64 ends of the first 56 and second 62 coil springs could be retained in slots 68 located in the rear cross beams 30. Hence, the first 58 and second 60 ends of the first coil spring project in opposite directions.

If one of the ends 58, 60, 64, 66 of the coil springs 56, 62 is secured to a structure other than the seat back 34 the cylinder 54 may be rotatably secured to the seat back 34 wherein the seat back 34 and cylinder 54 rotate as one.

An actuator is included for moving the second end 60 relative to the first end 58 for unwinding the first coil spring 56 in a clockwise direction from the gripping engagement with the cylinder 54 to allow the pivotal movement of the seat back 34 relative to the seat frame and for moving the fourth end 66 relative to the third end 64 for unwinding the second coil spring 62 in a counterclockwise direction from the gripping engagement with the cylinder 54 to allow the pivotal movement of the seat back relative to the seat frame. As will be appreciated, the clockwise movement and counterclockwise movement depends upon which side is viewed and are terms of relative definition and are not limiting as one may be substituted for the other.

The actuator includes a cam shaft 72 in parallel relationship to the cylinder 54 and engaging the second 60 and fourth 66 ends, the cam shaft 72 being rotatably supported by the upright members 40 of the seat back 34 for rotary movement between a set position with the coils 56 and 62 in the gripping engagement with the cylinder 54 to prevent the pivotal movement of the seat back 34 relative to the seat frame and a release position in which the second 60 and fourth 66 ends have been moved in an unwinding direction to unwind the coils 56 and 62 from the gripping engagement to allow the pivotal movement of the seat back 34 relative to the seat frame. The cam shaft 72 includes cam lobes in the form of grooves 74 for moving the second 60 and fourth 66 ends between the set and release positions. An arm 76 extends radially from the cam shaft 72 and a manually actuatable release cord 78 is connected to the arm 76 for rotating the cam shaft 72.

A biasing spring 80 reacts between the seat back 34 and a shaft 82 fixed to the flanges 32 for urging the seat back 34 to pivot relative to the seat frame when the coils 56 and 62 are in the release position.

As stated above the first 56 and second 62 coil springs are in constant engagement with the cylinder 54 when the seat back 34 is in a rest position. During excessive acceleration or deceleration, i.e., a rear end collision or a frontal collision, the coil springs 56, 62 will automatically grip the cylinder 54 and reduce the frontal or rearward movement of the seat back 34. Specifically, in a rear end collision the seat back 34 will have a tendency to move backward which will pull the third end 64 of the second coil spring 62 backward, thereby progressively gripping the cylinder 54. In other words, as the tendency for the seat back 34 to move rearward increases the gripping force applied to the cylinder 54 increases. Conversely, in a frontal collision the seat back 34 will have a tendency to move forward which will pull the first end 58 of the first coil spring 56 forward and progressively grip the cylinder 54. Accordingly, the subject invention also provides a added safety feature to the seat back 34.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A seat assembly comprising:

a seat frame:

a seat back including a pair of spaced upright members each having lower ends and upper ends;

mounting members at said lower ends for mounting said seat back to said seat frame for pivotal movement relative to said seat frame about a pivot axis;

a control mechanism for controlling said pivotal movement of said seat back including a cylinder concentric with said pivot axis and non-rotatably secured to said seat frame, and first and second coil springs wound around and in gripping engagement with said cylinder, said first coil spring having first and second ends extending tangentially from said cylinder, and said second coil spring having third and fourth ends extending tangentially from said cylinder, said first and third ends being secured to said seat back; and an actuator for moving said second and fourth ends relative to said first and third ends, said actuator including a cam shaft in parallel relationship to said cylinder and directly engaging and selectively moving said second and fourth ends, wherein said cam shaft is rotatably supported by said seat back for rotary movement between a set position with said first and second coil springs being in gripping engagement with said cylinder to prevent pivotal movement of said seat back relative to said seat frame, and a release position with said second and fourth ends being moved in an unwinding direction to unwind said first and second coil springs from gripping engagement with said cylinder to allow pivotal movement of said seat back relative to said seat frame.

2. An assembly as set forth in claim 1 wherein each of said coils is rectangular in cross section with one of the sides thereof in said gripping engagement with said cylinder.

3. An assembly as set forth in claim 1 wherein said seat back defines slots and said first and third ends are retained in said slots.

4. An assembly as set forth in claim 1 wherein said cam includes cam lobes for moving said second and fourth ends between said set and release positions.

5. An assembly as set forth in claim 4 including an arm extending from said cam shaft and a manually actuatable release connected to said arm for rotating said cam shaft.

6. An assembly as set forth in claim 1 including a biasing spring for urging said seat back to pivot relative to said seat frame when said coils are in said release position.

7. A seat assembly comprising:

a seat frame:

a seat back including a pair of spaced upright members each having lower ends and upper ends;

mounting members at said lower ends for mounting said seat back to said seat frame for pivotal movement relative to said seat frame about a pivot axis;

a control mechanism for controlling said pivotal movement of said seat back including a cylinder concentric with said pivot axis and non-rotatably secured to said seat frame, and first and second coil springs wound around and in gripping engagement with said cylinder, said first coil spring having first and second ends extending tangentially from said cylinder, and said second coil spring having third and fourth ends extending tangentially from said cylinder, said first and third ends being secured to said seat back; and an actuator for moving said second and fourth ends relative to said first and third ends, respectively, for unwinding said first and second coil springs in a direction from said gripping engagement to allow said pivotal movement of said seat back relative to said seat frame, said actuator including a cam shaft in parallel relationship to said cylinder, said cam shaft being rotatably supported by said seat back for rotary movement, wherein said cam shaft directly and simultaneously engages said second and fourth ends when rotated between a set position with said coil springs in said gripping engagement with said cylinder to prevent said pivotal movement of said seat back relative to said seat frame and a release position having moved said second end in a first unwinding direction to unwind said first coil spring from said gripping engagement and having moved said fourth end in a second unwinding direction to unwind said second coil spring from gripping engagement to allow said pivotal movement of said seat back relative to said seat frame.

* * * * *